United States Patent [19]

Cottingham

[11] 4,226,657

[45] Oct. 7, 1980

[54] METHOD OF MAKING REFLECTING FILM REFLECTOR

[75] Inventor: James G. Cottingham, Center Moriches, N.Y.

[73] Assignee: The United States of America as represented by the United States Department of Energy, Washington, D.C.

[21] Appl. No.: 906,820

[22] Filed: May 17, 1978

[51] Int. Cl.$^2$ .......................... B32B 31/08; G02B 5/08
[52] U.S. Cl. ..................................... 156/196; 156/245; 156/289; 350/292; 350/296
[58] Field of Search ............... 350/288, 292, 293, 296, 350/320; 156/214, 232, 233, 241, 245, 289, 247, 631, 277, 196, 212; 126/270, 271; 428/310, 315; 106/38.24

[56] References Cited

U.S. PATENT DOCUMENTS

| | | | |
|---|---|---|---|
| 2,464,157 | 3/1949 | Scheer et al. | 156/232 |
| 2,765,248 | 10/1956 | Beech et al. | 156/232 |
| 2,901,361 | 8/1959 | Meisel | 106/38.24 |
| 3,030,259 | 4/1962 | Long | 350/292 |
| 3,506,507 | 4/1970 | Brietzke | 156/631 |
| 3,607,584 | 9/1971 | Becht | 350/293 |
| 3,840,417 | 10/1974 | Yager | 156/289 |
| 3,855,027 | 12/1974 | Erdmann et al. | 156/289 |
| 3,912,380 | 10/1975 | Klein | 350/292 |
| 3,993,528 | 11/1976 | Pauly | 350/293 |
| 4,115,177 | 9/1978 | Nelson | 156/245 |
| 4,124,277 | 11/1978 | Stang | 350/292 |

Primary Examiner—Jerome W. Massie
Attorney, Agent, or Firm—James E. Denny; Leonard Belkin; Cornell D. Cornish

[57] ABSTRACT

A reflector of the reflecting film type is disclosed and which may be used in a heliostatic system for concentrating solar energy and comprising a reflecting film bonded to an appropriate rigid substrate in such a way that specularity of a very high order is achieved. A method of bonding the reflecting film to the substrate is also disclosed and comprises the steps of initially adhering the film to a smooth, clean flat rigid surface with a non-bonding liquid between the rigid surface and film, and then bonding the substrate and film. The non-bonding liquid has a molecular adhesion greater than any stresses due to handling or curing of the bonding agent which is applied between the film and the opposing surface of the rigid substrate.

3 Claims, 1 Drawing Figure

U.S. Patent
Oct. 7, 1980
4,226,657
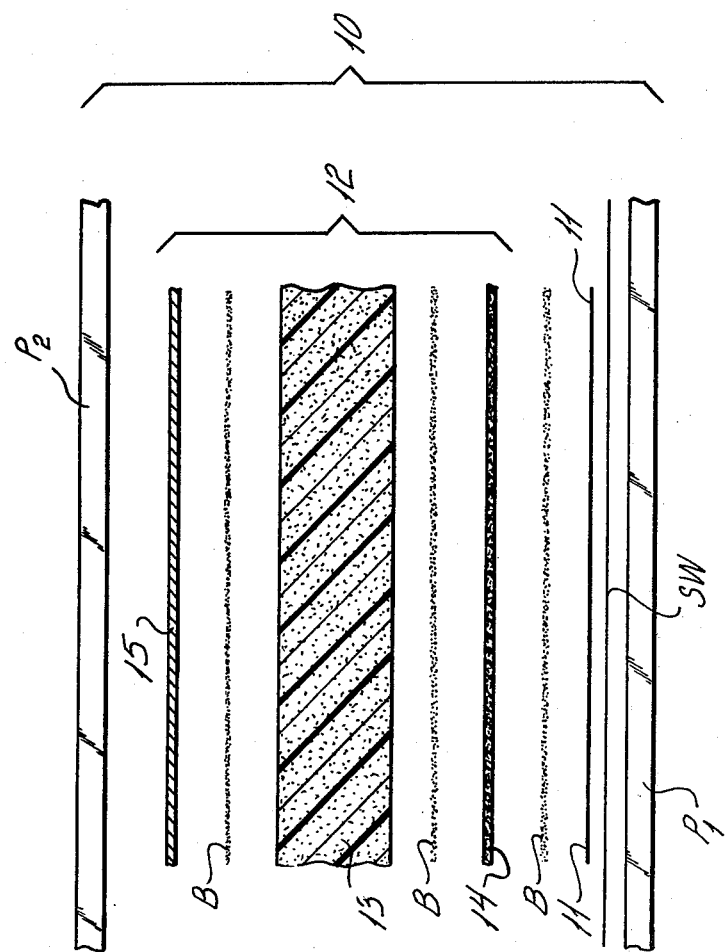

METHOD OF MAKING REFLECTING FILM REFLECTOR

BACKGROUND OF THE INVENTION

This invention was made under, or during the course of contracts with the United States Department of Energy and the New York State Enegy Research Development Authority.

Means for concentrating solar energy are being widely studied and developed. Most systems involve the use of reflectors in various configurations. These reflectors are of two types, glass mirrors and reflecting films. When specular precision is required, glass mirrors have been the only choice because techniques for film bonding have failed to meet specular requirements; that is, when the film is bonded to a rigid substrate the bonding agent, while curing, effects a wrinkling of the reflecting film. Resultingly, the advantageous if light weight, easily supported solar energy concentrators has not been available for these systems.

Furthermore, while there are many bonding techniques for forming composite layers and which utilize non-bonding materials to prevent sticking of the product to the mold or press plates, etc. (see for instance the patent to Dickey, U.S. Pat. No. 1,352,436) and to prevent sticking of the individual layers in the composite body (see the patents to Troetzmueller, U.S. Pat. No. 2,558,632 and to Kelly et al, U.S. Pat. No. 3,969,174, which also discloses a method for producing a plastic laminate having improved surface smoothness), the art has not taught any successful technique for retaining the reflecting film in a flat condition against the action of the bonding agent between the film and its carrier or rigid substrate while the bonding agent is curing; i.e., drying.

Techniques for forming "glassless" mirrors are disclosed in U.S. Pat. No. 3,877,139 and in the patent to Benzies U.S. Pat. No. 3,434,181, but forming such mirrors with the specularity achieved by the present invention is not possible with these techniques which, to the inventor's knowledge, have not achieved specularity better than 3 milliradians.

It is therefore an object of the invention to provide a reflector of the reflecting film type and which exhibits a specularity of a very high order, for instance, of one milliradian or better and comprising a reflecting film bonded to a rigid but light weight backing or substrate.

Desirably, the substrate presents a very smooth surface for bonding the reflecting film thereto and in this resoect, when the main body portion of the substrate conveniently is made of light weight polystyrene foam or similar material, a sheet having such a smooth surface may be provided between the film and main body portion. A structural layer of a suitable sheet material may also be secured to the back of the main portion.

The method of the invention comprises the steps of initially laying the film, reflective side down, upon a smooth surface, such as glass, with a non-bonding liquid having high molecular adhesion between the film and the glass and then bonding the non-reflective side to an appropriate rigid backing. The non-bonding liquid preferably has temporary adhesion greater than the forces encountered during the application and curing of the bonding agent and handling of the assembly during production and can consist of a soap and water mixture or any such liquid which can be readily parted or otherwise eliminated after bonding.

The method of the invention lends itself to the production of relatively large reflectors of the reflecting film type.

The invention will now be better understood upon a reading of the following description of one embodiment thereof with reference to the accompanying drawing which is a magnified, exploded schematic side view, partially in section, of a reflector of the invention during its production via the method of the invention.

The reflector 10 of the invention is comprised basically of a reflecting film 11 bonded to a rigid substrate 12, the optical specularity of the reflecting surface being of very high quality and in the order of about one milliradian. A reflecting film used in making the product in the example which shall now be described, comprised a plastic film coated with a highly reflective material and is sold under the trademark DUNCHROME by the Dunmore Corp. of Newton, Pa. Other films, of course, may be used, such as those made of transparent polyester film.

The rigid backing or substrate 12 is made up of a sandwich of the main body portion made of polystyrene foam 13 bonded between smooth metal or plastic sheet 14 and a 0.010" aluminum sheet 15. The smooth sheet 14 is utilized to provide a smooth surface for bonding to the film 11 while the polystyrene foam main body portion 13 is utilized for its light weight and moldability characteristics. The aluminum sheet 15 is provided as a protective and structural layer for the polystrene foam.

The bonding material indicated as B utilized in the example was a wet epoxy glue which dry cures. However, any suitable bonding material may, of course, be utilized. Care should be taken though to select materials and bonding agents which do not react chemically so as to cause dimensional changes which may degrade the specularity of mirrors so produced.

The steps comprising the inventive technique for making the reflector are best performed in a dirt-free room and where wiping is indicated, lint-free wiper elements should be used, such as filter paper or, even more desirably, a brush with radioactive source, such as a polonium brush.

One quarter inch plate glass $P_1$ and one half inch aluminum plate $P_2$ were used for the pressing.

The bottom pressing plate $P_1$ or receptor plate as it may be called, was carefully cleaned and wiped with lint-free chemical filter paper to eliminate or greatly decrease the possibility of dimples appearing in the resulting reflecting surface due to pressing the lint to the surface in the pressing process. A final wash with soap and water and a final wipe was given the bottom pressing plate as was the sheet of reflecting film.

A concentrated soap-water solution indicated diagrammatically by the line SW was then applied to the upper surface of the lower pressing plate $P_1$, and sandwiched between the lower pressing plate $P_1$ and the reflective surface of the film 11 which was laid over the wetted plate.

The film was carefully rubbed to remove all excess soap-water solution and care was taken not to scratch the film.

A light layer of epoxy was then applied to the film and then the smooth sheet 14 was laid over the film. Epoxy was then applied to the smooth sheet 14 and the polystyrene foam body portion 13 was placed upon the smooth sheet 14. Similarly, epoxy was applied to the back of the polystyrene foam 13 and the aluminum sheet 15 was laid upon the epoxy.

On top of the aluminum a parting sheet of Teflon was set in place and then the top pressing plate $P_2$ was placed on top of the assembly. Weight, usually lead bricks, were placed on top of the top pressing plate.

The assembly was allowed to set for a period sufficient to allow the bonding agent to cure, typically 24 hours.

The assembly was then taken from between the plates and trimmed of excess materials.

The resulting reflecting surface looked excellent and exhibited the high specularity which had been the aim of the invention. The use of the concentrated soap-water solution was effective to deter "wrinkling" during the curing of the epoxy, it being determined that the solution had a temporary adhesion greater than the stresses placed upon the film due to the application, pressing and curing of the epoxy.

It has been determined that the method of the invention can be utilized in making much larger reflector surfaces than had been previously possible, particularly with the degree of specularity achieved. For instance, the present technique has been used to produce reflectors as large as from one foot by one foot to four feet by four feet, and there does not appear to be a limit to the size reflector which can be produced, within obvious physical limitations imposed by available materials, manufacturing facilities and tools.

The compressibility and moldability of the polystyrene foam can be utilized in the present invention most conveniently to provide a concave backing or substrate to the reflectors. In one instance, a reflector made in accordance with the invention was concave with a 150 foot radius of curvature.

Hereinafter the term "simply curved" is intended to include, for drafting convenience, flat surfaces, as a limiting case. This is appropriate since as the radius of curvature become large such a surface does become essentially flat.

It can be noted that the concentration of soap-water can vary very widely, as can the type of soap utilized; i.e., detergents, glycerine based soaps, etc. In the example above, "Joy" liquid detergent was used.

As can be appreciated, the invention is not limited to such details, but only to and except as may be expressed in the following claims.

What is claimed is:

1. A method of bonding a reflecting film to a rigid substrate comprising:
    (a) sandwiching a nonbonding adhesive medium between a smooth, simply curved receptor surface and a reflecting film, said surface having a radius of curvature great enough that said film may conform to said surface without wrinkling;
    (b) bonding said substrate to the opposite side of said film with a bonding adhesive medium while said film is held in smooth contact with said surface by said nonbonding medium, said nonbonding medium further comprising a liquid soap having a temporary adhesion greater than the stresses upon said film generated by the application and curing of said bonding adhesive medium; and,
    (c) removing said film and said bonded substrate from said surface after curing of said bonding adhesive medium.

2. The method of claim 1 wherein said substrate comprises a main body portion of foamed plastic and sheet of material having a smooth surface bonded to said portion and said receptor surface is flat.

3. The method of claim 1 wherein pressure is applied to said substrate during bonding of said substrate to said reflecting film.

* * * * *